G. A. LYON.
AUTOMOBILE BUFFER.
APPLICATION FILED JUNE 3, 1919.
1,325,740.
Patented Dec. 23, 1919.
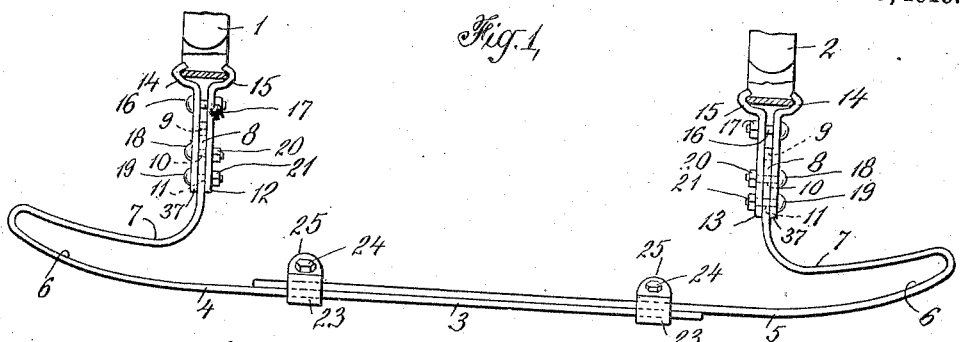
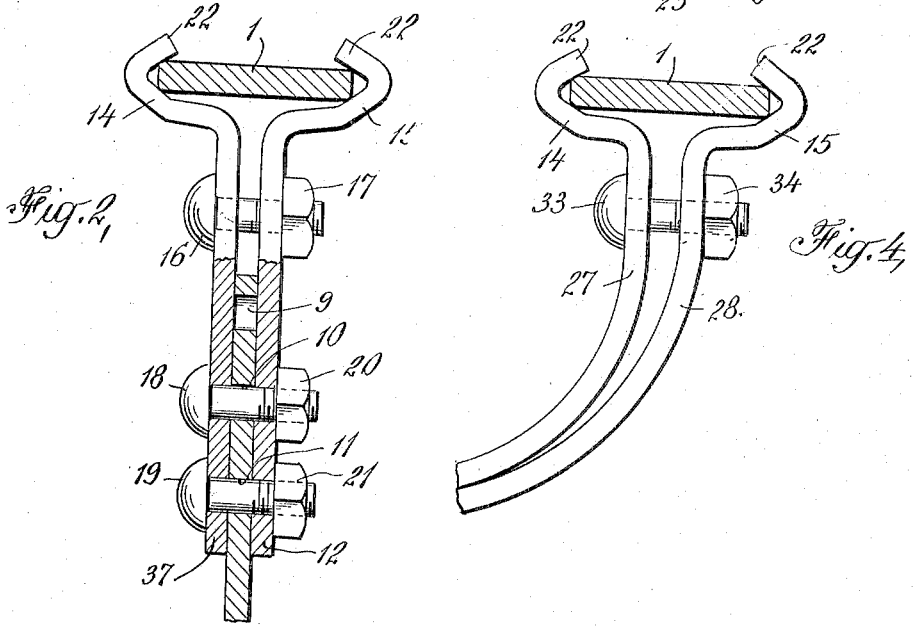
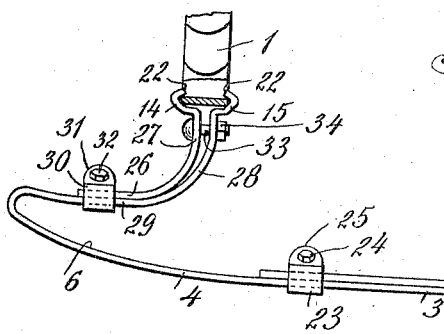
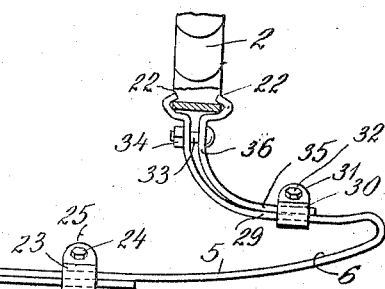
Inventor
George Albert Lyon
By his Attorney
Harry L. Duncan

UNITED STATES PATENT OFFICE.

GEORGE ALBERT LYON, OF PHILADELPHIA, PENNSYLVANIA.

AUTOMOBILE-BUFFER.

1,325,740.  Specification of Letters Patent.  Patented Dec. 23, 1919.

Application filed June 3, 1919. Serial No. 301,499.

*To all whom it may concern:*

Be it known that I, GEORGE ALBERT LYON, a citizen of the United States, and resident of Philadelphia, county of Philadelphia, and State of Pennsylvania, have made a certain new and useful Invention Relating to Automobile-Buffers, of which the following is a specification, taken in connection with the accompanying drawing.

This invention relates especially to resilient strip buffers particularly adapted for use on the rear of automobiles and arranged for clamping connection with the rear elliptic or other springs thereof. The buffer may comprise one or more vertically rigid horizontally yielding members or strips of tempered spring steel or other suitable material and by using a pair of such spring strip members their coöperating impact receiving portions may be arranged so as to overlap and form a doubled reinforcement at this part of the buffer so that the buffer width may be readily adjusted to suit automobiles having springs located at different distances apart. The buffer may be provided with open end loops which may extend outwardly and forwardly from the doubled impact receiving member of the rear buffer and the clamping device preferably of resilient spring strip, may have one or more of its members integrally or detachably connected to these attaching or connecting members of the buffer. The clamps may have gripping jaws provided with angularly disposed portions or grooves to engage the rear springs or other parts of the automobile on opposite edges and clamping bolts extending through the clamping arms adjacent the jaws may resiliently force the jaws together to insure a reliable and secure connection of the buffer to the automobile.

In the accompanying drawings showing in a somewhat diagrammatic way illustrative embodiments of this invention, Figure 1 is a plan view of the buffer as applied to the rear springs of an automobile.

Fig. 2 is an enlarged section through the clamping portion of the buffer.

Fig. 3 is a plan view showing another form of buffer clamped upon the automobile springs; and Fig. 4 is an enlarged section of the clamping device therefor.

The buffer may comprise two substantially similar tempered spring steel strips which may be rendered substantially vertically rigid while horizontally yielding in a resilient manner by giving the strips many times as great vertical width as thickness. Each of these strips which may be a quarter to three-eighths of an inch thick and one and three-quarters to two and one-quarter inches wide, for instance, may be formed as shown in Fig. 1 with a substantially straight impact receiving portion 4, 5 and these portions may overlap each other at 3 to form a doubled reinforcing impact receiving member and correspondingly increase the resilient strength of the central part of the buffer. These members may be adjustably connected and held in substantially vertically rigid relation by any suitable connecting means, such as the frictionally gripping connecting clips 23 having the bolts 24 passing through and drawing together their angularly extended ends 25 as is well known in this art. The buffer members may have the outwardly and angularly extending open end loops 6 and the inwardly curved portion 7 which may terminate in a suitable connecting or attaching portion, such as 8, which may form substantially parallel strip ends in case the clamping devices are to be adjustably connected thereto and by correspondingly arranging the adjustable connection of the impact receiving members or portions these connecting members may be at such distances apart as correspond to the width of the rear springs of the particular automobile to which the buffer is to be attached.

As shown more in detail in Fig. 2, the connecting end 8 may be formed with a series of adjusting connecting holes or slots 9, 10, 11, which in the case of round holes may be spaced apart at substantially equal distances corresponding to the coöperating holes in the clamping arms 12, 37 through which may extend such connecting bolts as 18, 19 so as to tightly connect these parts when the nuts 20, 21 are screwed home. This makes it possible to secure a considerable range of fore and aft adjustment between the clamping jaws or members engaging the automobile springs 1, 2, for instance, and the impact receiving member of the buffer, since the connecting bolts may pass through any desired set of holes in these coöperating members so that by forming the desired number of holes in the connecting end or clamping arms as much as several inches adjustment may be secured, if desired, and at the same time the clamping members may be securely connected to the buffer. These clamping members may in many cases be advantageously formed of similar resilient spring steel strip and may be provided with integral gripping jaws having angularly disposed coöperating faces 14, 15 adjacent the ends 22 so that the vehicle spring may be engaged on its opposite edges in such way as to secure strong and reliable connection therewith when two such clamping jaws engage each of the springs. A clamping bolt 16 may be used to force these clamping jaws together and this bolt may be arranged in any convenient position adjacent the jaws so as to give the desired somewhat resilient clamping action thereto which is stronger of course the nearer the clamping bolt is arranged to the jaws. Such horizontally arranged V grooved clamping members of resilient material can secure a very desirable gripping engagement with automobile springs when forcibly engaging their opposite edges and reliable connection may thus be readily secured with a minimum danger of weakening or cracking the springs. If desired, of course, the clamping jaws may be forced together so tightly as to limit or practically prevent resilient yield of the inch or two of the rear springs which is inclosed within these gripping jaws and this of course minimizes working of the springs within the jaws under operating conditions and still further decreases the chances of slipping.

In Figs. 3 and 4 the clamping devices or members may comprise in each case a clamping jaw formed integral with the attaching or connecting end of the buffer strip and the coöperating clamping jaw may be formed on a generally similar but separate piece or strip of material either inside or outside of the integral jaw member and secured thereto by one or more clamping bolts, such as the bolt 33 and nut 34. This bolt may pass through a suitable hole or slot in the separate or detachable clamping member 27 which may be formed adjacent its end 22, with a V grooved jaw 14 to coöperate with the jaw portion 15 of the other clamping end 22 of the buffer member. This buffer member or connecting portion 28 may advantageously be formed with a transversely extending clamping alining portion 29 arranged substantially transversely across the buffer so as to be parallel to the front or central portion 3 of the impact receiving members and the detachable clamping member 27 may have a clamping arm or end 26 adapted to be alined with this transverse portion 29 and be held thereto as by the connecting clip 30 which may have its bolt 32 extending through the ends 31 of the clip which may be tightened after the connecting bolt 33 has been tightened to grip the automobile spring 1. In this way the symmetrical horizontal closing of the clamping jaws upon the opposite edges of the spring is promoted and a greater degree of rigidity secured because the spring strips 26 and 29 both contribute to support the buffer. The other automobile spring 2 may be similarly clamped by the clamping jaws formed in the coöperating clamping portions 29, 36 similarly clamped together by the clamping bolt 33 and nut 34 after which their transversely extending alining portions 29, 35, may be securely connected and held in position as by the clip 30.

This invention has been described in connection with a number of illustrative embodiments, forms, proportions, parts, arrangements, materials and methods of connection and use, to the details of which disclosure the invention is not of course to be limited, since what is claimed as new and what is desired to be secured by Letters Patent is set forth in the appended claims.

I claim—

1. The automobile buffer adapted to be attached to the rear elliptic springs of an automobile and consisting of two spring steel strips having greater vertical width than thickness to render them relatively rigid vertically while resiliently yielding in horizontal directions, said strips having adjustably connected impact receiving portions and each of said strips having an outwardly extending open end loop and a forwardly extending connection portion formed with a series of connecting holes and adapted to form parallel connecting strip members located at adjustable distances apart to fit different automobiles, a plurality of resilient strip clamping members having substantially parallel arms and connecting bolts extending through said arms to adjustably connect said clamping members to each of said connecting members, clamping jaws having V groove gripping portions on said clamping members and a clamping bolt to close said clamping jaws horizontally against the opposite edges of the automobile spring.

2. The automobile buffer adapted to be attached to the rear elliptic springs of an automobile and consisting of two strips having greater vertical width than thickness, said strips having adjustably connected impact receiving portions and each of said strips having a forwardly extending connection portion adapted to form parallel connecting strip members located at adjustable distances apart to fit different automobiles, a plurality of resilient strip clamping members having substantially parallel arms adjustably connected to said connecting members, and a clamping bolt to close said clamping members horizontally against the opposite edges of the automobile spring.

3. The automobile buffer adapted to be attached to the rear elliptic springs of an automobile and comprising an impact receiving portion and forwardly extending substantially parallel connecting members formed with a series of connecting holes located at adjustable distances apart, a plurality of resilient strip clamping members having substantially parallel arms and connecting bolts extending through said arms to adjustably connect said clamping members to each of said connecting members and connected horizontally closing clamping jaws having angular gripping portions adapted to close against the opposite edges of the automobile spring.

4. The automobile buffer adapted to be attached to the rear springs of an automobile and comprising an impact receiving portion and forwardly extending substantially parallel connecting members, a plurality of resilient strip clamping members having substantially parallel arms and adjustably connected to said connecting members and connected horizontally closing clamping jaws having angular gripping portions adapted to close against the opposite edges of the automobile spring.

5. The automobile buffer adapted to be attached to the rear springs of an automobile and comprising an impact receiving portion and extending resilient strip connecting members, and coöperating resilient strip clamping members having angular gripping portions adapted to be clamped against the opposite edges of the automobile springs.

6. The automobile buffer adapted to be attached to the rear springs of an automobile and comprising an impact receiving portion and extending connecting members and coöperating clamping members having gripping portions adapted to be clamped against the opposite edges of the automobile springs.

7. The automobile buffer adapted to be attached to the rear elliptic springs of an automobile and having an impact receiving portion and having adjacent each end of the buffer forwardly extending substantially parallel connecting clamping members formed with angular gripping portions and clamping bolts adapted to close said gripping portions against the opposite edges of the automobile springs.

8. The automobile buffer adapted to be attached to the rear elliptic springs of an automobile and having an impact receiving portion and having adjacent each end of the buffer extending connecting clamping members formed with angular gripping portions adapted to close against the opposite edges of the automobile springs.

GEORGE ALBERT LYON.